United States Patent Office 2,754,296
Patented July 10, 1956

2,754,296
ANTIHISTAMINIC COMPOUNDS

Ruth Stüttgen, Dusseldorf, Germany, assignor to Schi-Wa Chemisch-Pharmazeutische Fabrik G. m. b. H., Glandorf-Averfehrden, Bizirk Osnabruck, Germany No Drawing. Application August 11, 1951,
Serial No. 241,490

Claims priority, application Germany September 1, 1950

1 Claim. (Cl. 260—211)

It is known that antihistaminic substances when employed therapeutically produce undesirable secondary effects, which appear as palpitation of the heart, vertigo, fluctuations in blood pressure, sleepiness and the like. Attempts have been made to prevent this by the employment, simultaneously with the antihistaminic substances, of caffeine for instance or substances having a spasmolytic effect. Such employment however is only relatively transiently effective in preventing the secondary phenomena, and furthermore gives rise to the danger of creating an addiction during the long course of treatment which is necessary.

It has now been found that double compounds of antihistaminic substances with saccharides, or double compounds thereof with an excess of saccharides, when employed therapeutically, will prevent or greatly reduce the undesirable secondary effects. These products of the method to which the invention relates are remarkable in that they not only reduce the toxic secondary effects but also are effective for a longer time. Furthermore they enable the therapeutic effect to be obtained by means of smaller doses of antihistaminic substances than is the case with the normal method of administration. For practical treatment, it has been found that besides oral administration, parenteral administration also is particularly effective.

These double compounds are produced by melting or mixing the antihistaminic substances as bases or, more advisably, in the form of their salts—most advantageously as hydrochlorides—with mono- or polysaccharides in molar quantities or even multiples thereof. It is also possible to make the reaction take place in solvents or diluents. It has been found advantageous to use water as a solvent. It is particularly advantageous to add an excess of saccharides to the aqueous solution of the double compound, since this results in a stable solution capable of being sterilised and also in a satisfactory therapeutic effect. Of the saccharides, grape sugar has proved particularly suitable for this purpose. The following are some of the antihistaminic substances which are suitable for the reaction: N-(dimethylaminoethyl)-phenothiazine, dimethylamino-ethyl benzylaniline, 2-(N-dimethylaminoethyl-N-benzylamino)-pyridine, α-phenyl-α-2-pyridyl-γ-dimethylaminopropane, 2-(N-phenyl-N-benzylaminomethyl)-imidazoline, dimethylamino-ethyl-benzhydrylether, pyrrolidylethylbenzhydrylether.

Example 1

1.5 grams of dimethylaminoethylbenzhydrylether hydrochloride are mixed with 1 gram of grape sugar with gentle heating, whereupon the double compound forms. It has a melting point of 95° C. and is readily soluble in water.

Example 2

0.9 gram of dimethylaminoethylbenzhydrylether hydrochloride is melted with 1.4 grams of grape sugar at about 110 to 120° C., until a clear molten substance is obtained. After cooling, the double compound has a melting point of 108° C. If in the above process the quantities used are 0.5 gram and 1.8 grams, the double compound obtained will have a melting point of 120° C. These substances are easily soluble in water, and with an excess of grape sugar give colorless, stable solutions capable of being sterilised.

Example 3

1.5 grams of pyrrolidylethylbenzhydrylether and 1 gram of galactose are agitated with 25 cubic centimeters of benzol. The excess benzol is then distilled off over the water bath under reduced pressure, and the double compound then remains. By the addition of water and of the calculated quantity (calculated on the base) of n/1 hydrochloric acid a clear solution is obtained.

Example 4

0.9 gram of dimethylaminoethylbenzhydrylether hydrochloride is mixed with 2.8 grams of cane sugar, whereupon a double compound forms which is readily soluble in water.

Example 5

1.5 grams of dimethylaminoethylbenzhydrylether hydrochloride are dissolved in 500 cubic centimeters of water, 200 grams of grape sugar are added and the whole is made up to 1000 cubic centimeters by the addition of water. The clear neutral solution is capable of being sterilised and is very suitable for parenteral administration.

If 10 cubic centimeters of the solution described above are administered to a patient with disorders in which histamine or substances resembling histamine play a pathogenetic part, these symptoms will be effectively suppressed after normal administration. If however on the appearance of the same symptoms the same patient is treated merely with 10 cubic centimeters of a solution as described above but without grape sugar, the effect is more transient and the known secondary effects appear distinctly.

If in Example 5 dimethylaminoethylbenzhydrylether is replaced by 2-(N-phenyl-N-benzylaminomethyl)-imidazoline or 2-(N-dimethylaminoethyl-N-benzylamino)-pyridine or N-(dimethylaminoethyl)-phenothiazine, solutions are obtained which have the same therapeutic effect.

I claim:

As a new composition of matter, the reaction product of dimethylaminoethylbenzhydrylether with grape sugar.

References Cited in the file of this patent
UNITED STATES PATENTS

| | | |
|---|---|---|
| 1,815,979 | Kolle et al. | July 28, 1931 |
| 2,128,851 | Rimboch | Aug. 30, 1938 |
| 2,233,419 | Moore | Mar. 4, 1941 |
| 2,274,593 | Despois | Feb. 24, 1942 |
| 2,275,809 | Roberts | Mar. 10, 1942 |
| 2,287,071 | Tillitson | June 23, 1942 |
| 2,426,011 | Friedman et al. | Aug. 19, 1947 |
| 2,533,066 | Taplin et al. | Dec. 5, 1950 |
| 2,566,376 | Shelton | Sept. 4, 1951 |

FOREIGN PATENTS

| | | |
|---|---|---|
| 475,291 | Great Britain | Nov. 17, 1937 |

OTHER REFERENCES

Mayer: J. of Allergy, May 1946, page 153.